(12) United States Patent
Kito (10) Patent No.: US 6,999,785 B2
(45) Date of Patent: Feb. 14, 2006

(54) COMMUNICATION SYSTEM FOR TRANSFERRING LARGE DATA FROM NETWORK INTERFACE TO RADIO INTERFACE

(75) Inventor: Eiji Kito, Tokyo (JP)

(73) Assignee: NEC Corporation, Tokyo (JP)

( * ) Notice: Subject to any disclaimer, the term of this patent is extended or adjusted under 35 U.S.C. 154(b) by 767 days.

(21) Appl. No.: 09/911,537

(22) Filed: Jul. 25, 2001

(65) Prior Publication Data

US 2002/0016178 A1    Feb. 7, 2002

(30) Foreign Application Priority Data

Jul. 25, 2000    (JP)    ............... 2000-224108

(51) Int. Cl.
*H04B 7/00* (2006.01)
*H04Q 7/20* (2006.01)

(52) U.S. Cl. ............... 455/522; 455/422.1; 455/512; 455/513; 455/68; 370/315; 370/330

(58) Field of Classification Search ............ 455/422.1, 455/423, 424, 426.1, 450, 451, 452.1, 452.2, 455/501, 512, 513, 514, 560, 561, 68, 522; 370/318, 320, 322, 329, 330, 332, 333, 335, 370/341, 342, 348, 315, 321, 336
See application file for complete search history.

(56) References Cited

U.S. PATENT DOCUMENTS 5,914,950 A * 6/1999 Tiedemann et al. ......... 370/348

| 6,128,512 A | * | 10/2000 | Trompower et al. | ........ 455/561 |
| 6,408,188 B1 | * | 6/2002 | Park | ........................ 455/466 |
| 6,512,752 B1 | * | 1/2003 | H'mimy et al. | ............ 370/329 |
| 6,850,512 B1 | * | 2/2005 | Bishop et al. | .............. 370/342 |

FOREIGN PATENT DOCUMENTS

| EP | 0 998 069 | 5/2000 |
| JP | A 2-35837 | 2/1990 |
| JP | 8-307320 | 11/1996 |
| JP | 2856199 | 11/1998 |
| JP | A 11-275059 | 10/1999 |
| JP | 2000-236573 | 8/2000 |
| WO | WO 96/37081 | 11/1996 |
| WO | WO 97/23073 | 6/1997 |
| WO | WO 99/30442 | 6/1999 |
| WO | WO 01/80445 | 10/2001 |

* cited by examiner

*Primary Examiner*—Nick Corsaro
*Assistant Examiner*—Shaima Q. Aminzay
(74) *Attorney, Agent, or Firm*—Young & Thompson (57) ABSTRACT

An object of the present invention is to provide a communication system which can efficiently transfer data having a comparatively large capacity from a network interface through a radio interface. A mobile telephone is allowed to access a contents server from a base station through a mobile communication network and the Internet. Although the sum of electric power which the base station simultaneously transmits to all of the mobile telephones has an upper limit, the transfer rate to any mobile telephone that is transmitting or receiving large data are changed to a higher level, within a range of a margin. The electric power to the mobile telephone may be checked, and the data transfer rate may be increased when the checked electric power is small.

9 Claims, 7 Drawing Sheets

COMMUNICATION SYSTEM FOR TRANSFERRING LARGE DATA FROM NETWORK INTERFACE TO RADIO INTERFACE

BACKGROUND OF THE INVENTION

1. Technical Field of the Invention

The present invention relates to a communication system which has a radio interface and a network interface, and particularly to a communication system that is suitably used for a case in which a comparatively large amount of data are acquired in the network interface by using a mobile telephone for carrying out a communication by using, for example, a code division multiple access system.

2. Description of the Prior Art

Various wireless terminals, such as mobile telephones and portable computers provided with wireless functions, have been generally used. These can transmit and receive data in the same manner as comparatively large desk top computers. Moreover, since these apparatuses can execute communications everywhere, these have come to be widely used on business, etc. Recently, the wireless terminals are used not only for electronic mails, but also for accessing and browsing home pages on the world wide web (WWW) and for downloading various kinds of data.

Figure 6:
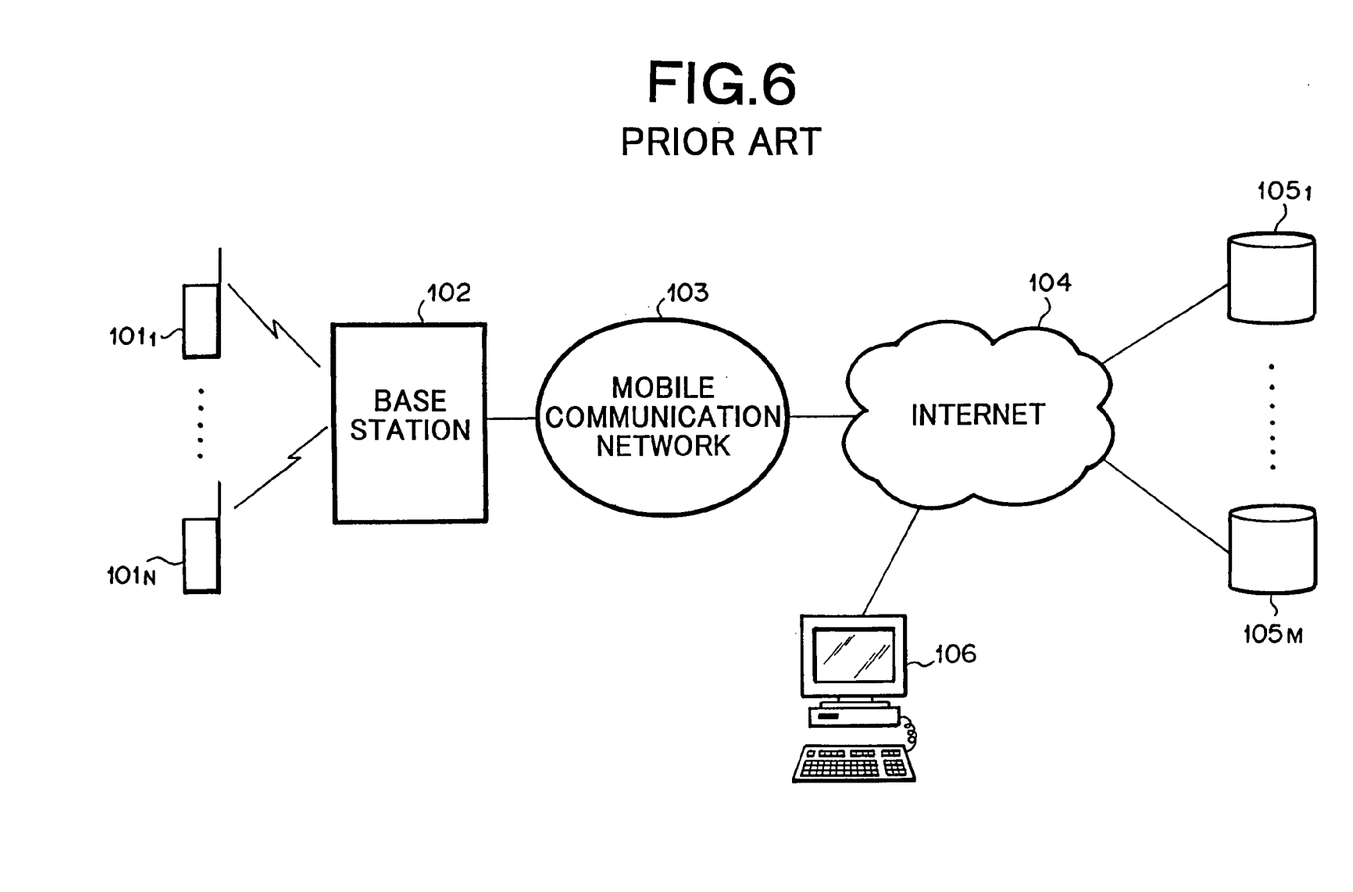
FIG. 6 is a system block diagram that schematically shows a communication system in which a mobile telephone is used for utilizing the Internet.

FIG. 6 schematically shows a communication system in which a mobile telephone is used for utilizing the Internet. Mobile telephones $101_1$ to $101_N$ are wirelessly connected to a base station 102. The base station 102, which is shown as only one station for convenience of explanation, is connected to a mobile communication network 103 so that the mobile telephones 101 are allowed to communicate with each other through the base station 102 of the mobile communication network 103. The mobile communication network 103 is connected to the Internet 104. Apparatuses, such as contents servers $105_1$ to $105_M$ for storing various contents of information and personal computers 106, etc., are connected to the Internet 104.

When a personal computer 106 in an office or home is used for accessing home pages so as to browse the page or download files, the connection is made to the Internet 104 usually through a cable network such as a public telephone network, thereby designating one of the uniform resource locators (URL) of the contents servers $105_1$ to $105_M$ to acquire contents that one wants.

When a mobile telephone 101 is used for accessing a home page, the same processes are basically carried out. However, there is a great difference in the way how the contents are downloaded from the contents servers $105_1$ to $105_M$.

The personal computer 106 can download the data in a comparatively short period of time, because it is connected through a cable network, although the time period depends upon transfer rates of modem and communication channel.

On the other hand, the transfer rate of the radio interface between the mobile telephones $101_1$ to $101_N$ and the base station 102 is lower in general than that of the network interface from the base station 102 to the contents server $105_1$ to $105_M$, because the radio interface is designed for telephone conversation and transfer of small size data. Therefore, the transfer rate for a file with relatively large size is regulated by that of the radio interface. In Japanese Patent Application No. 10-529474 (1998), the transfer rate is not fixed by taking this special point into consideration.

Figure 7:
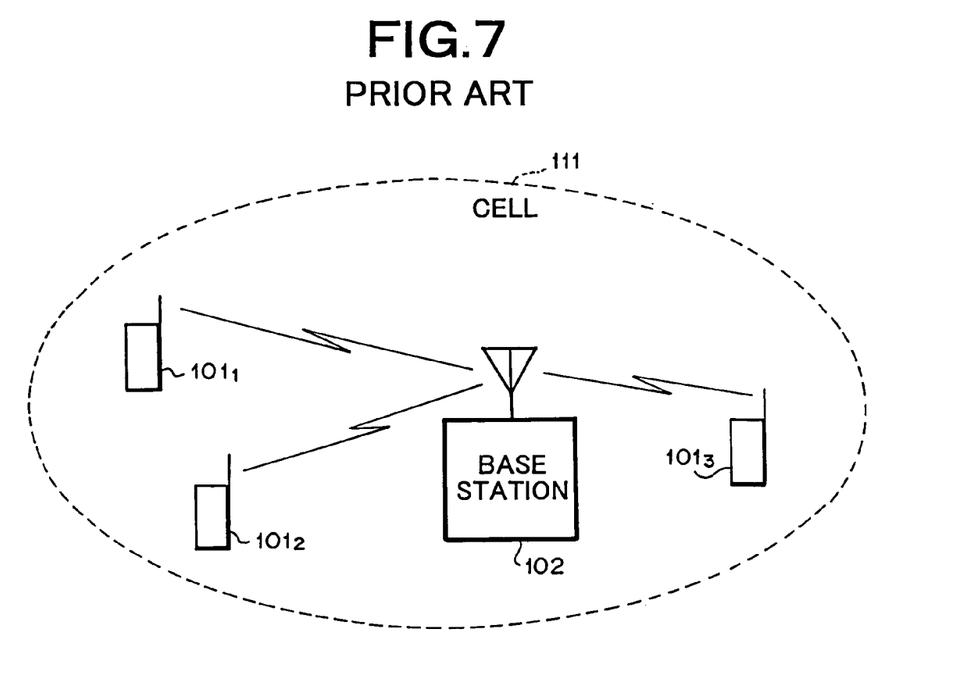
FIG. 7 is an explanatory drawing which shows the relationship among the base station, the distance from a mobile telephone and the intensity of the transmission power.

In order to explain this problem concretely, a relationship between the transmission power and the distance from the base station to the mobile telephones is explained, referring to FIG. 7. A broken line indicates the border of a cell 111 which the base station 102 controls. The first mobile telephone $101_1$ is located in the vicinity of the border of the cell 111. The second mobile telephone $101_2$ is located at the middle point between the border of the cell 111 and the base station 102. The third mobile telephone $101_3$ is located in the vicinity of the base station 102. The first to third mobile telephones $101_1$ to $101_3$ are connected with the base station 102 by the code division multiple access (CDMA).

In this manner, the mobile telephones $101_1$ to $101_3$ have respectively different distances from the base station 102.

Further, if it is assumed that the mobile telephones $101_1$ to $101_3$ communicate with the base station 102 by transmitting electromagnetic waves having an identical intensity, the base station 102 receives electromagnetic waves having different signal levels from the three mobile telephones. As a result, a signal received from the first mobile telephone $101_1$ located at the farthest position from the base station 102 is influenced by that from the third mobile telephone $101_3$ located at the nearest position from the base station 102. Therefore, the base station 102 can not receives the signals properly. The time division multiple access system (TDMA) and the frequency division multiple access system (FDMA) are less susceptible to such problems, because the timing of transmission and reception is divided for users in TDMA and the signal frequencies are divided for users in FDMA, although this is not always true for the TDMA which employs a single frequency bandwidth.

Therefore, conventionally, the base station 102 checks the signal levels received from the first to third mobile telephones $101_1$ to $101_3$, and controls the transmission powers outputted from the mobile telephones $101_1$ to $101_3$ so as to increase or decrease them so that these signal levels are almost equal to each other on the base station 102 side. Concretely, in this example, the transmission power from the first mobile telephone $101_1$ is increased, while the transmission power from the third mobile telephone $101_3$ is decreased, on the premise that the data transfer rate at which the respective mobile telephones $101_1$ to $101_3$ transmit data to the base station 102 is of a single value. The premise is based on the fact that the transmission powers can not be of a single value, if the data transfer rates are of plural values.

The data transfer rate at which the base station 102 transfers data to the respective mobile telephones $101_1$ to $101_3$ is also set to be of a single value. The transfer rate is fixed to be of a single value for transferring voices and small files.

Figure 8:
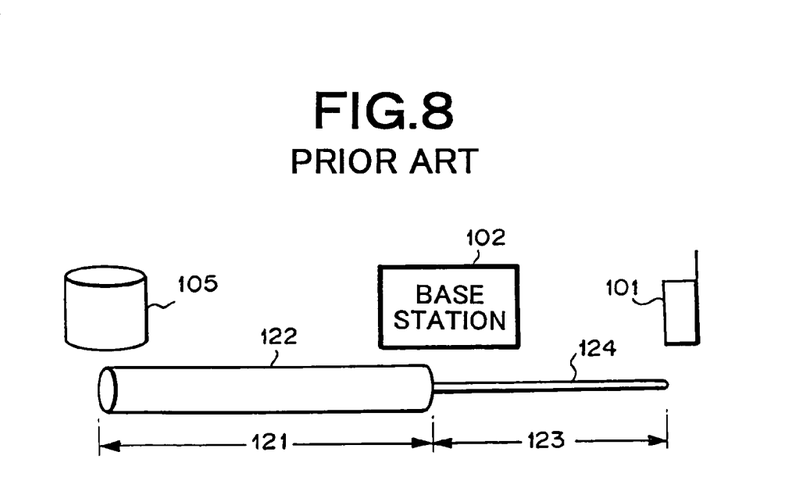
FIG. 8 is an explanatory drawing which shows the relationship between the network interface and radio interface in their data transfer amount in a conventional communication system.

FIG. 8 illustrates a relationship between the network interface and radio interface in their data transfer amount in this conventional communication system. Since the network interface 121 is employed between the contents server 105 and the base station 102, the network interface has a comparatively large capacity channel (high-speed communication channel) 122 so as to transfer a large amount data. Since the radio interface 123 used mainly for telephone conversation is employed between the base station 102 and the portable telephone 101, the radio interface has a comparatively small capacity channel (low-speed communication channel) 124. Therefore, in an attempt to download a file, etc., having a comparatively large capacity from the contents server 105, the communication time period becomes long, due to the small capacity channel 124. In other words, in an attempt to access a home page by utilizing the Internet 104 (FIG. 6), it spends much time to transfer a large file, resulting in a slow response and a failure to carry out a smooth operation.

SUMMARY OF THE INVENTION

Therefore, an object of the present invention is to provide a communication system which can efficiently transfer a comparatively large amount of data from a network interface through a radio interface.

The communication system of the present invention is provided with: (i) a data acquisition requesting means which requests data acquisition from a data source located within a network interface through a radio interface having a limitation in the sum of transmission power at the time when data communications are simultaneously carried out within a predetermined area; (ii) a data buffering means which temporarily stores the data that has been requested to acquire by the data acquisition requesting means at a predetermined position in the network interface before the radio interface, in association with the data requesting end; (iii) a radio interface data transmitting means which successively reads the data stored in the data buffering means and transmits the data to the data requesting end wirelessly; and (iv) a data transfer rate altering means which, in the case when there is much amount of data accumulation requested by the data requesting end and stored in the data buffering means, increases a data transfer rate in the radio interface within a range of a permissible value of the transmission power that is allocated in association with the other data communications within the radio interface.

In other words, when the data acquisition requesting means requests data acquisition from a data source located within a network interface through a radio interface, the data buffering means temporarily stores the data, upon transmitting the data to the requesting end wirelessly, and in the case when there is much amount of data accumulation stored therein, the data transfer rate in the radio interface is increased within a range of a permissible value of the transmission power that is allocated in association with the other data communications within the radio interface. In this manner, upon transferring a comparatively large amount of data through the radio interface, it is possible to increase the data transfer rate within a range of a permissible value, and consequently to carry out a transferring process efficiently.

The communication system of the present invention may be provided with: (i) a data acquisition requesting means which requests data acquisition from a data source located within a network interface through a radio interface in which communications are carried out by a code division multiple access system; (ii) a data buffering means which temporarily stores the data which has been requested by the data acquisition requesting means to acquire at a predetermined position in the network interface before the radio interface, in association with the data requesting end; (iii) a radio interface data transmitting means which successively reads the data stored in the data buffering means and transmits the data to the data requesting end wirelessly; and (iv) a data transfer rate altering means which, in the case when there is more amount of data accumulation requested by the data requesting end and stored in the data buffering means than a predetermined threshold value, increases a data transfer rate in the radio interface within a range of a permissible amount of the transmission power that is allocated in association with the sum of transmission power that is currently used for communications within the radio interface.

In other words, when the data acquisition requesting means requests data acquisition from a data source located within a network interface through a radio interface in which communications are carried out by a code division multiple access system, the data buffering means temporarily stores the data, upon transmitting the data to the requesting end wirelessly, and in the case when there is more amount of data accumulation thus stored than a predetermined threshold value, the data transfer rate in the radio interface is increased within a range of a permissible amount of the transmission power that is allocated in association with the sum of transmission power that is currently used for communications within the radio interface. In this manner, upon transferring a comparatively large amount of data through the radio interface using the code division multiple access system, it is possible to increase the data transfer rate within a range of a permissible value, and consequently to carry out a transferring process efficiently.

Further, the communication system of the present invention may be provided with: (i) a transmission power value measuring means for measuring a transmission power value at the time when data are transmitted to a mobile station by a code division multiple access system; (ii) a data accumulating means for temporarily accumulates the data to be transmitted to the mobile station; and (iii) a wireless transfer rate control means for controlling a wireless transfer rate to the corresponding mobile station in accordance with the transmission power value measured by the transmission power value measuring means and the amount of data accumulated by the data accumulating means.

In other words, the transmission power value measuring means measures a transmission power value at the time when data are transmitted to a mobile station by the code division multiple access system. Thus, the wireless transfer rate to the corresponding mobile station is controlled in accordance with the amount of data accumulated by the data accumulating means.

Further, the communication system may be provided with: (i) a transmission power value measuring means for measuring a transmission power value that is set at the time when data are transmitted to a mobile station by a code division multiple access system; (ii) a data accumulating means for temporarily accumulates the data transmitted to the mobile station; and (iii) a wireless transfer rate control means which, when the transmission power value measured by the transmission power value measuring means is smaller than a predetermined value, accelerates the wireless transfer rate to the corresponding mobile station as the amount of data accumulated in the data accumulating means becomes greater.

In other words, the transmission power value measuring means measures a transmission power value at the time when data are transmitted to a mobile station by the code division multiple access system. When there is a large amount of data accumulation in the data accumulating means, with a small transmission power value, the wireless transfer rate is increased within a range of a margin in the transmission power value.

Further, the communication system may be provided with: (i) a distance measuring means for measuring a distance from a mobile station; (ii) a data accumulating means for temporarily accumulating data to be transmitted to the mobile station by a code division multiple access system; and (iii) a wireless transfer rate control means which, when the distance measured by the distance measuring means is smaller than a predetermined value, accelerates the wireless transfer rate to the corresponding mobile station as the amount of data accumulated in the data accumulating means becomes greater.

In other words, the distance measuring means measures the distance from a mobile station that is the other communication end, and in the case when the distance measured by the distance measuring means is smaller than a predetermined value, since the transmission power has a margin, the wireless transfer rate to the corresponding mobile station is accelerated as the amount of data accumulated in the data accumulating means becomes greater.

Further, the communication system may be provided with: (i) a signal to interference noise ratio measuring means for measuring a signal to interference noise ratio when a mobile station carries out a communication; (ii) a data accumulating means for temporarily accumulating data to be transmitted to the mobile station by a code division multiple access system; and (iii) a wireless transfer rate control means which, when the signal to interference noise ratio with respect to a signal measured by the signal to interference noise ratio measuring means is smaller than a predetermined value, accelerates the wireless transfer rate to the corresponding mobile station as the amount of data accumulated in the data accumulating means becomes greater.

In other words, the signal to interference noise ratio measuring means measures a signal to interference noise ratio when a mobile station carries out a communication, and when the interference noise is smaller than a predetermined value, the wireless transfer rate to the corresponding mobile station is accelerated as the amount of data accumulated in the data accumulating means becomes greater; thus, it becomes possible to carry out a data transfer process efficiently, with the signal interference noise being maintained within a permissible range as a whole.

According to the present invention, when the data acquisition requesting means requests data acquisition from a data source located within a network interface through a radio interface, the data buffering means temporarily stores the data, upon transmitting the data to the requesting end wirelessly, and in the case when there is much amount of data accumulation stored therein, the data transfer rate in the radio interface is increased within a range of a permissible value of the transmission power that is allocated in association with the other data communications within the radio interface; therefore, upon transferring a comparatively large amount of data through the radio interface, it is possible to increase the data transfer rate within a range of a permissible value, and consequently to carry out a transferring process efficiently.

Further, according to the present invention, when the data acquisition requesting means requests data acquisition from a data source located within a network interface through a radio interface in which communications are carried out by a code division multiple access system, the data buffering means temporarily stores the data, upon transmitting the data to the requesting end wirelessly, and in the case when there is more amount of data accumulation thus stored than a predetermined threshold value, the data transfer rate in the radio interface is increased within a range of a permissible amount of the transmission power that is allocated in association with the sum of transmission power that is currently used for communications within the radio interface; therefore, upon transferring a comparatively large amount of data through the radio interface using the code division multiple access system, it is possible to increase the data transfer rate within a range of a permissible value, and consequently to carry out a transferring process efficiently. Further, in the present invention, it is possible to carry out the controlling operation irrespective of the currently transmitting power of the data requisition means of the mobile station, etc., as long as it is maintained within the range of a permissible value.

Further, according to the present invention, the transmission power value measuring means measures a transmission power value at the time when data are transmitted to a mobile station by the code division multiple access system; therefore, based upon the size of the transmission power to the mobile station, the wireless transfer rate to the corresponding mobile station is controlled in accordance with a resulting margin generated by each of the mobile stations.

Further, according to the present invention, the transmission power value measuring means measures a transmission power value at the time when data are transmitted to a mobile station by the code division multiple access system; therefore, when there is a large amount of data accumulation in the data accumulating means, with a small transmission power value, the wireless transfer rate is increased within a range of a margin in the transmission power value.

Further, according to the present invention, when the distance measured by the distance measuring means is smaller than a predetermined value, since the transmission power has a margin, the distance measuring means measures the distance from a mobile station that is the other communication end, and the wireless transfer rate to the corresponding mobile station is accelerated as the amount of data accumulated in the data accumulating means becomes greater.

Further, according to the present invention, the signal to interference noise ratio measuring means measures a signal to interference noise ratio when a mobile station carries out a communication, and when the interference noise is smaller than a predetermined value, the wireless transfer rate to the corresponding mobile station is accelerated as the amount of data accumulated in the data accumulating means becomes greater; thus, it becomes possible to carry out a data transfer process efficiently, with the signal interference noise being maintained within a permissible range as a whole.

PREFERRED EMBODIMENT OF THE INVENTION

Figure 1:
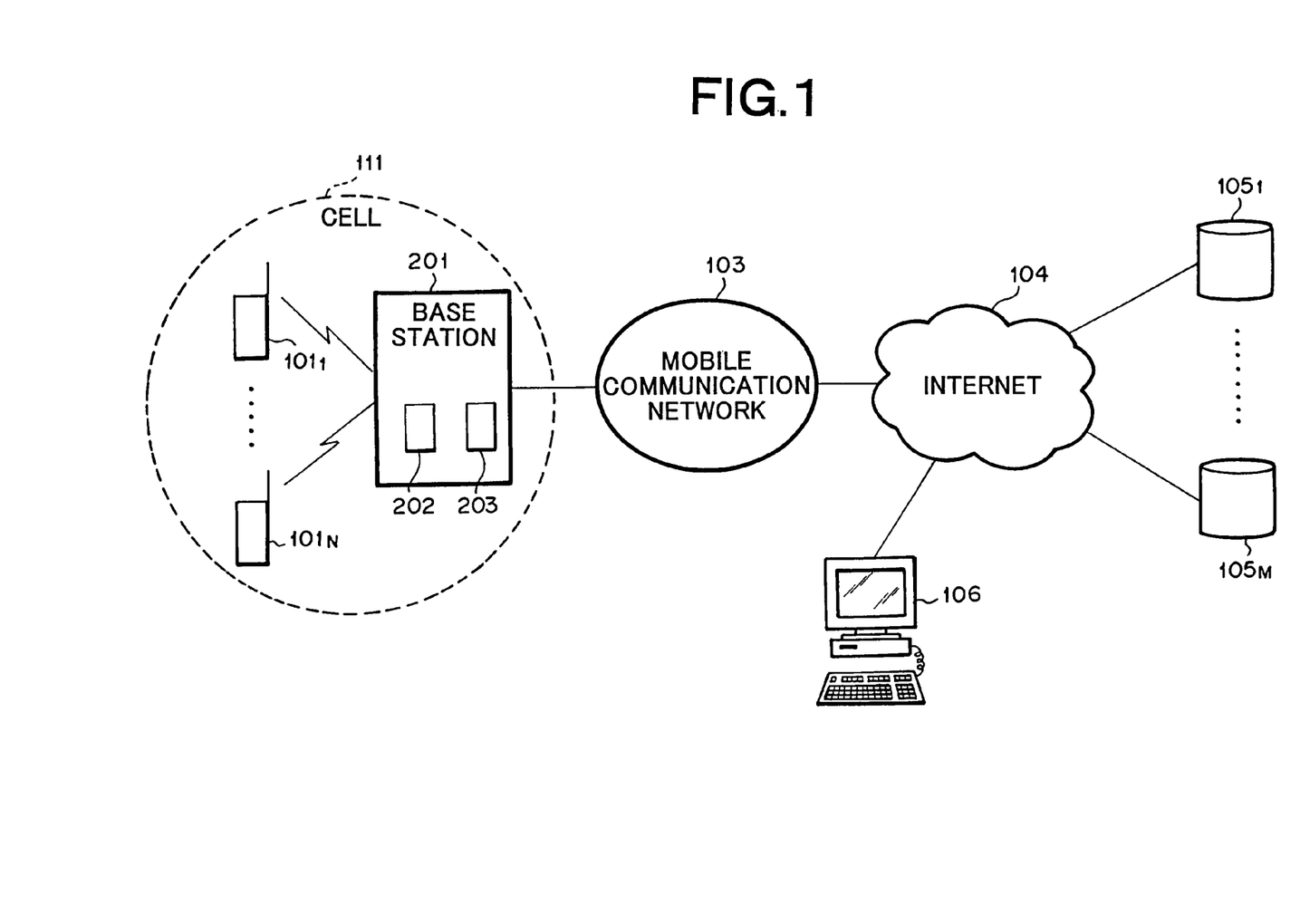
FIG. 1 is a block diagram of the communication system in accordance with one preferred embodiment of the present invention.

FIG. 1 is a block diagram of the communication system of the present invention. In this Figure, the reference numerals are the same as those of FIG. 6, and the description thereof is selectively omitted. A transfer rate setting section 202 and a data buffer 203 are placed in a base station 201 of the present preferred embodiment. The transfer rate setting section 202 is designed to select one of numbers "K" (K: an integer not less than 2) of transfer rates which are fixed in each of mobile telephones $101_1$ to $101_N$, within a range of a permissible value of the transmission power in a cell 111 that is controlled by the base station 201. The base station 201 communicates with respective mobile telephones $101_1$ to $101_N$ by the CDMA. In this case, the upper limit of the sum of transmission power is fixed to $V_{MAX}$.

Figure 2:
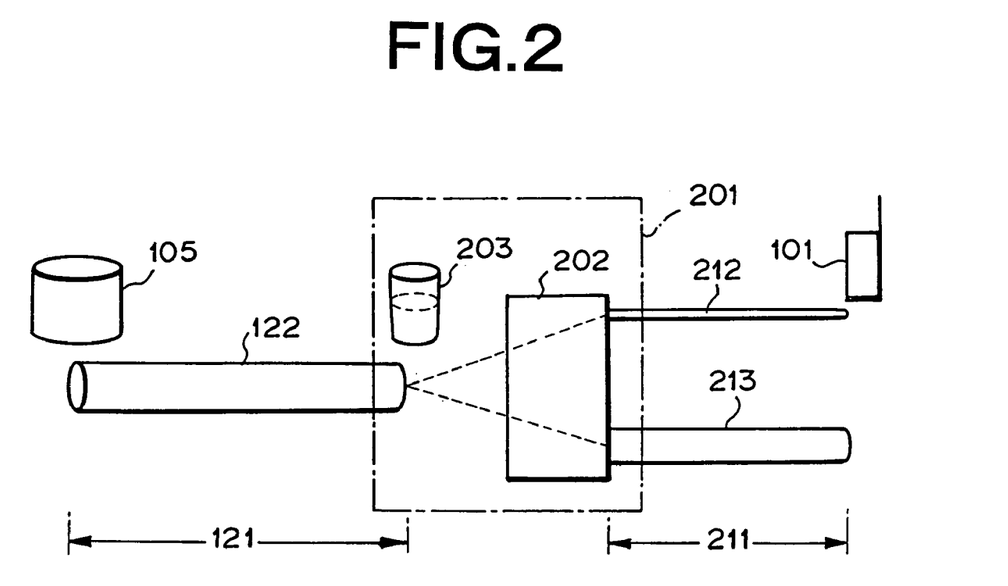
FIG. 2 illustrates the relationship between the network interface and the radio interface in the data transfer amount in the case of "3" of the value K.

FIG. 2 illustrates the relationship between the network interface and the radio interface in the data transfer amount in the case of "3" of the value "K". Since a network interface 121 is formed between the contents server 105 and the base station 201, a comparatively wide band transfer channel (high-speed communication channel) 122 is prepared so as to transfer a large amount of data communication. Data are transferred from the contents server 105 through the transfer channel 122, and are stored in a data buffer 203 in a classified manner in its destination. Then, in the radio interface 211, either of wireless or radio transfer channels 212, 213 having the two kinds of transfer rates selected by the transfer rate setting section 202 is selected depending upon destinations. Finally, the data are transferred through the radio channel 212, or 213 to the mobile telephone 101. The first wireless transfer channel 212 is a low-speed communication channel, while the second wireless transfer channel 213 is a communication channel having a data transfer rate that is four times the data transfer rate of the first one.

Figure 3:
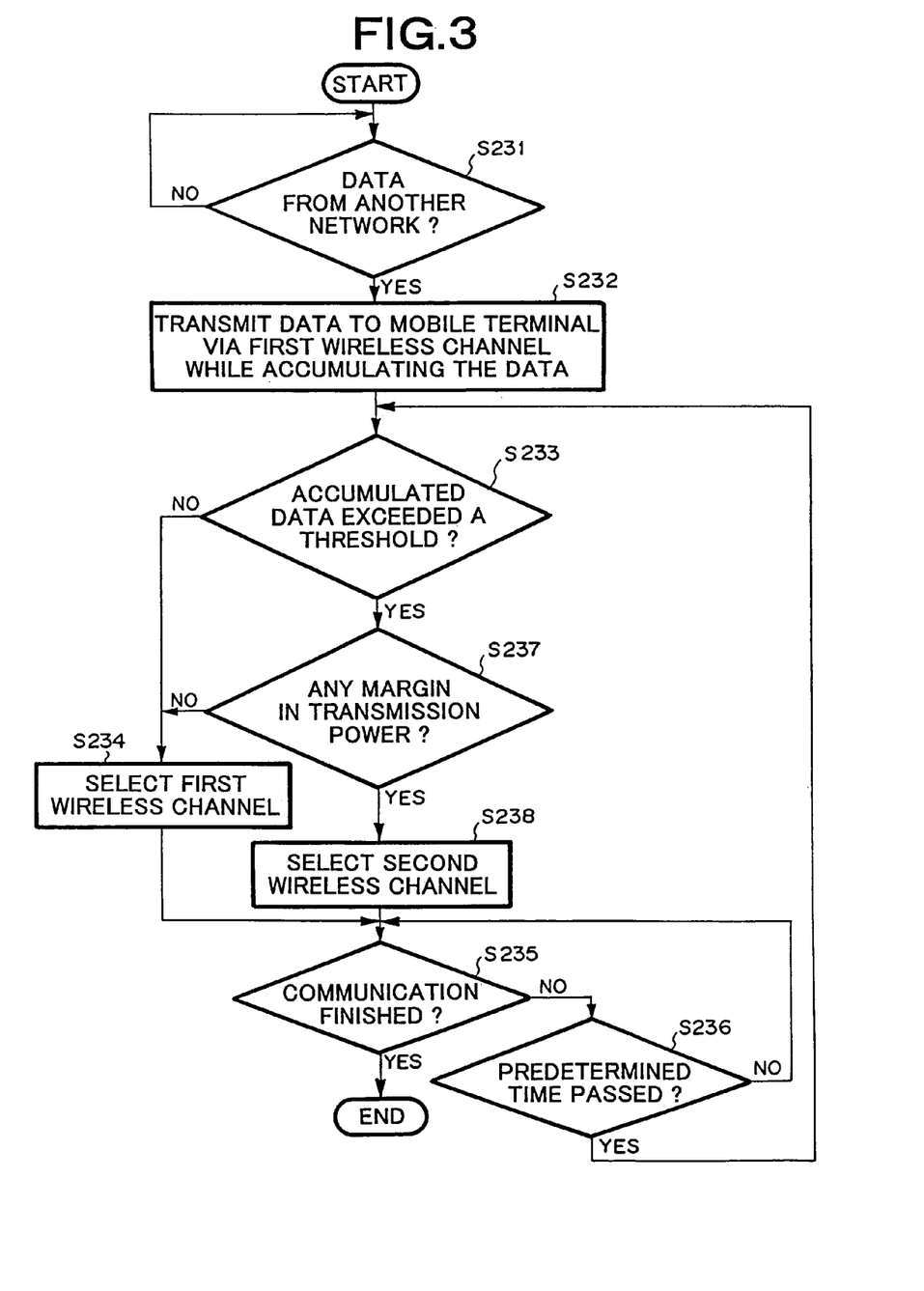
FIG. 3 shows a controlling state of the transfer rate setting section in the case when data are received from another network in the communication system of the present preferred embodiment.

FIG. 3 shows a controlling state of the transfer rate setting section in the case when data are received from another network in the communication system of the present preferred embodiment. The transfer rate setting section 202 is provided with a non-shown central processing unit (CPU), and carries out a controlling operation based upon a program that is stored in a non-shown read only memory (ROM). In other words, the CPU of the transfer rate setting section 202 waits for data from another network (Step S231). Upon receipt of data (YES), the received data are transferred to the object mobile telephone 101 initially using the first wireless transfer channel 212, while the received data are stored in the data buffer 203 (Step S232). Next, the CPU reads the accumulated amount in the data buffer 203 of data that is addressed to the mobile telephone 101, and judges whether or not the accumulated amount has exceeded a predetermined threshold (Step S233). If the threshold is not exceeded (NO), the selection of the first wireless transfer channel 212 (Step S234) is maintained.

In this communication state, the transfer rate setting section 202 successively checks whether or not the communication is finished and whether or not a fixed period of time has passed (step S235, S236). When the fixed period of time has passed since the start of the data transfer (step S236: YES), it again reads out the accumulated amount in the data buffer 203 of data addressed to the mobile telephone 101, and judges whether or not the accumulated amount has exceeded the predetermined threshold (step S233). When the received data are voice data for conversation, the threshold value will never be exceeded.

However, when a large file of image from a home page is being received, the accumulated amount of data in the data buffer 203 increases, and the threshold value may be exceeded. In step S233: YES, the CPU calculates the sum of powers that the base station 201 is transmitting to all the mobile telephones $101_1$ to $101_N$ within the cell 111. Then, it checks whether or not the sum of powers has not exceeded the upper limit $V_{MAX}$, and also checks whether or not there is any margin in the power that is sufficient to switch from the first wireless transfer channel 212 to the second wireless transfer channel 213 (step S237). When there is any margin (YES), the transfer rate setting section 202 switches the data communication channel for data addressed to the mobile telephone 101 from the first wireless transfer channel 212 to the second wireless transfer channel 213 (step S238). Then, the sequence proceeds to step S235 at which the same processes as described above are repeated. In other words, while the accumulated amount of data in the data buffer 203 has exceeded the threshold as in the case of downloading large files, the second wireless transfer channel 213 is selected. On the other hand, when the amount of downloaded data becomes small as in the case of viewing a specific page in a home page spending a long time, the channel is switched to the first wireless transfer channel 212 (step S234), because the accumulated amount of data goes below the threshold. Thereafter, the same processes are carried out. The above-mentioned controlling operation is continued until the communication is finished (step S235: YES).

If there is any margin in the electric power to be transmitted by the base station 201 shown in FIG. 1, the margin is preferentially allocated to those mobile stations having great amount of data yet to be received. Therefore, the present preferred embodiment is achieved on the assumption that such a margin exists.

Figure 4:
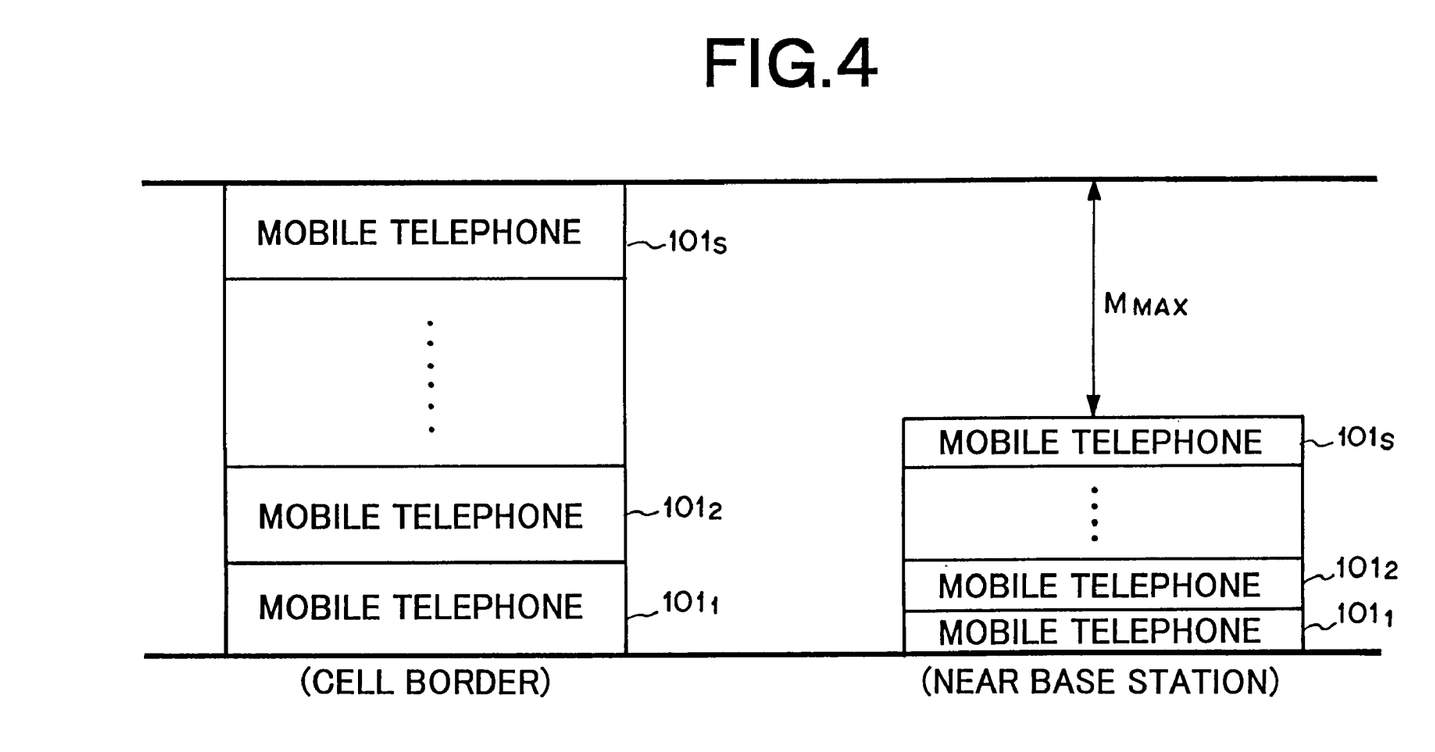
FIG. 4 is a drawing that explains the degree of margin of power in the communication system of the present preferred embodiment.

FIG. 4 illustrates a degree of margin of electric power in the communication system of the present preferred embodiment. Here, it is assumed that "S" is the number of mobile telephones 101 that can simultaneously communicate in association with the transmission power within one cell 111 shown in FIG. 1. The transmission power becomes the upper limit $V_{MAX}$, when all the "S" mobile telephones $101_1$ to $101_S$ are located in the vicinity of the border of the cell 111. However, all of the "S" mobile telephones $101_1$ to $101_S$ are not always located in the vicinity of the border within the cell 111.

On the contrary, when all of the "S" mobile telephones $101_1$ to $101_S$ are located in the vicinity of the base station 201, a greatest margin $M_{MAX}$ arises as a gap from the upper limit $V_{MAX}$, since the transmission power is minimized. From the statistical point of view, the average margin is approximately a ½ of the greatest margin $M_{MAX}$. Moreover, when the number of the currently communicating mobile telephones 101 becomes less than "S", more margin is provided. In the present preferred embodiment, within a range of the degree of margin in the transmission power in association with the upper limit value $V_{MAX}$, the higher speed transfer channel is allocated to any communication that has a great data transfer amount per unit time.

Figure 5:
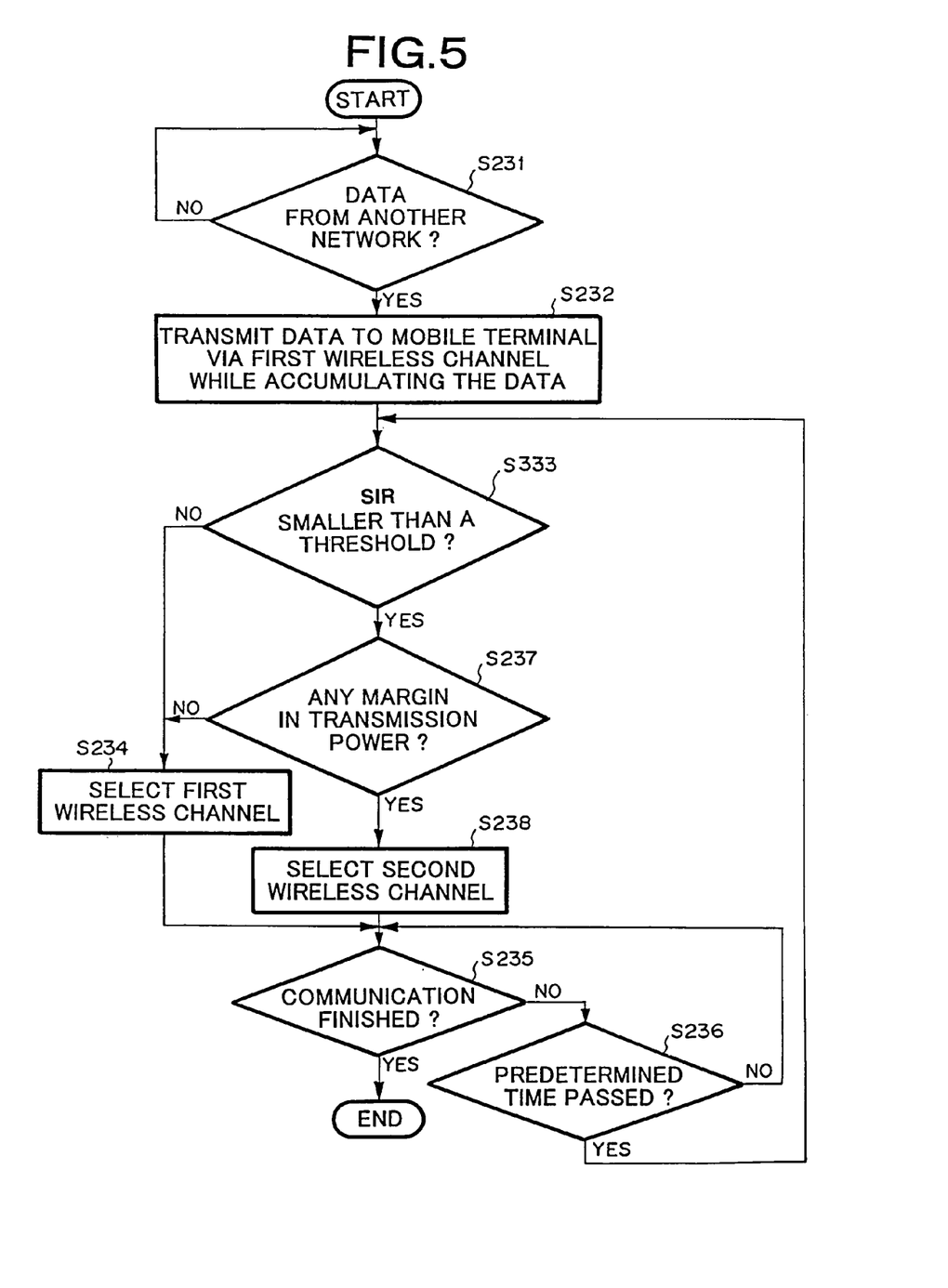
FIG. 5 is a flow chart that shows a controlling state of the transfer rate setting section in the case when data are received from another network in a Modified Example in the present invention.

FIG. 5 shows a controlling state of the transfer rate setting section when data are received from another network. A signal to interference noise ratio (SIR) in the current transfer rate is compared with a predetermined value. When the SIR is small, the transfer rate for the mobile telephone 101 is increased until the SIR reaches the predetermined value. The reference numerals in FIG. 5 are the same as those of FIG. 3, and the description thereof is selectively omitted.

At step S333 in FIG. 5, the base station 201 checks the SIR, upon transmitting the received data to the object mobile telephone 101. During the period when the SIR is smaller than a predetermined value (YES), the communication channel for data addressed to the mobile telephone 101 is switched from the first wireless transfer channel 212 to the second wireless transfer channel 213 (step S238), under the condition that there is a margin in the transmission power in the entire cell 111 (step S237: YES). On the other hand, when there is not any margin in the transmission power (step S237: NO), the first wireless transfer channel 212 is maintained.

Occasionally, the SIR goes above the threshold value. In this case, the communication channel for data addressed to the object mobile telephone 101 is switched from the second wireless transfer channel 213 to the first wireless transfer channel 212, in order to provide a high-speed transfer rate to other mobile telephone 101,.

In the above-explained embodiment, the accumulated amount of data in buffer 203 is checked every predetermined time period in order to switching a low speed channel to a high speed channel, when there is any margin in the sum of transmission powers.

However, the accumulated amount of data may checked, every time when a file is downloaded from a home page.

Further, two or more transfer rates may be prepared, and threshold values of a plurality of levels may be prepared.

Further, the transfer rate may be switched on the basis of an increasing rate or decreasing rate of the received data stored in data buffer 203.

Further, in the above-explained embodiments, the transfer rate setting section 202 and the data buffer 203 are placed inside the base station 201.

However, these may be placed in the mobile communication network 103 shown in FIG. 1. In this case, the selection of the transfer channels having different transfer rates is carried out by a non-shown control section in the mobile communication network 103, and the resulting instruction is given to the corresponding individual base station 201.

Further, in the above-explained embodiments, the CDMA is used in the radio interface.

However, the present invention may be of course applied to all the communication systems wherein data are acquired from a data source located in a network interface through a radio interface having a limitation in the sum of transmission power when data communications are simultaneously carried out in a predetermined area.

Furthermore, in the above-explained embodiments, the accumulated amount of data in the data buffer 203, or the SIR of the received signal is checked so as to control the transfer rate.

However, the transmission power from the mobile telephone may be checked so as to control the transfer rate. In this case, the wireless transfer rate to the corresponding mobile station is increased in accordance with the amount of accumulated data in the data buffer (data accumulating means) 203, when the transmission power is small.

The distance of the mobile telephone from the base station may also be checked so as to control the transfer rate. In this case, the wireless transfer rate to the corresponding mobile station is increased in accordance with the amount of accumulated data in the data buffer (data accumulating means) 203, when the distance is small.

What is claimed is:

1. A communication system, which comprises:
    data acquisition requesting means located in a radio interface for requesting, through said radio interface wherein a sum of transmission power in a cell is limited when communications are simultaneously carried out, data acquisition from a data source located in a network interface;
    data buffering means located in said network interface for temporarily storing the data requested by said data acquisition requesting means;
    data transmitting means located in said network interface for successively reading out said data stored in said data buffering means and for transmitting said data to said data acquisition requesting means; and
    data transfer rate control means located in said network interface for increasing a data transfer rate in said radio interface within the limited electric power of transmission, when said data stored in said data buffering means exceed a prescribed threshold.

2. The communication system according to claim 1, wherein said radio interface employs code division multiple access system.

3. The communication system according to claim 1, which further comprises power measuring means located in said network interface for measuring an electric power of transmitting said data to said data acquisition requesting means,
    wherein said data transfer rate control means controls said data transfer rate in accordance with the measured electric power and the accumulated amount of said data.

4. The communication system according to claim 3, wherein said data transfer rate control means increases said data transfer rate, as the amount of data accumulated in the data accumulating means becomes greater, when the measured electric power is smaller than a predetermined value.

5. The communication system according to claim 1, which further comprises distance measuring means for measuring a distance between said data acquisition requesting means and said data transfer rate control means,
    wherein said data transfer rate control means increases said data transfer rate, as accumulated amount of said data increased, when the measured distance is smaller than a prescribed value.

6. The communication system according to claim 1, which further comprises signal to interference noise ratio (SIR) measuring means for measuring a SIR of data transmitted by said data transmitting means,
    wherein said data transfer rate control means increases said data transfer rate, as accumulated amount of said data increased, when the measured SIR is smaller than a prescribed value.

7. A communication system, comprising:
    a base station that is connected via a network connection to a content server;
    mobile stations that are connected to said base station via respective radio connections; and
    said base station comprising a data buffer that stores data transmitted from the content server to said base station via said network connection, and a transfer rate setting section that sets a data transfer rate from said data buffer to one of said mobile stations via a respective one of said radio connections based on an amount of data in said data buffer,
    wherein said transfer rate setting section monitors a total of power transmitting from said base station to all said mobile stations, and wherein when the total of power is less than a maximum transmitting power for said base station and when the amount of data in said data buffer exceeds a threshold, said data transfer rate setting section increases the transfer rate from said data buffer to the one of said mobile stations.

8. The communication system of claim 7, wherein when an amount of data in said data buffer is less than the threshold, said transfer rate setting section decreases the data transfer rate to the one of said mobile stations.

9. The communication system of claim 7, wherein when the total of power equals or exceeds the maximum transmitting power, said transfer rate setting section decreases the data transfer rate to the one of said mobile stations.

* * * * *